United States Patent Office

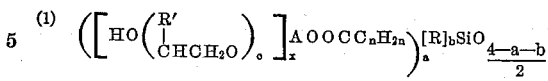

2,991,300
Patented July 4, 1961

2,991,300
POLYALKYLENEOXIDE ESTERS OF CARBOXY-ALKYLPOLYSILOXANES
Gustav A. Schmidt and Howard A. Vaughn, Jr., Schenectady, N.Y., assignors to General Electric Company, a corporation of New York
No Drawing. Filed Sept. 16, 1959, Ser. No. 840,249
11 Claims. (Cl. 260—448.2)

This invention relates to novel organopolysiloxane compositions, and in particular is directed to novel organopolysiloxane compositions which contain both hydrophilic and hydrophobic portions. This invention is also directed to the method of preparing these compositions.

One of the characteristics of conventional organopolysiloxane materials is their insolubility in and inertness to water. In fact, this characteristic of organopolysiloxanes has made them extremely useful in the preparation of water-repellent formulations to be applied to various types of surfaces. In addition, this inertness and insolubility in water has led to the use of organopolysiloxanes in many electrical insulation applications where reactivity with water presents serious difficulties. However, there are many applications in which it is desirable to provide organopolysiloxanes which do have some degree of compatibility with water. Thus, when it is desired to apply organopolysiloxanes to various surfaces, it is desirable to have some means for incorporating the organopolysiloxane into water for application to the surface, with the subsequent evaporation of the water. Furthermore, it is desirable to have emulsifying agents which can be used to form aqueous emulsions of water-insoluble organopolysiloxanes without the addition to the emulsion of non-silicone materials, as is the common practice.

This need for water-soluble organopolysiloxanes has been recognized in the past and one proposed solution to the problem has been to provide organopolysiloxanes containing silicon-bonded alkoxy radicals. While these materials have been soluble in water, they present a serious disadvantage in that they are relatively unstable at a pH which varies to any substantial degree from 7. Thus, when a solution of these alkoxyorganopolysiloxanes in water is allowed to stand, the normal absorption of carbon dioxide from the air has resulted in sufficient acidity to cause cleavage of the silicon-bonded alkoxy radicals which caused a subsequent condensation of the siloxane to a water-insoluble state and, rather than having a solution of organopolysiloxane, the resulting material has had two separate phases.

A still further proposed solution to the problem of providing water-soluble organopolysiloxanes is by the formation of organopolysiloxanes containing silicon-bonded alkoxyalkyl radicals. While these alkoxyalkyl-containing silicones have certain desirable properties, they suffer from two distinct disadvantages. First, their solubility in water is only limited and, second, the small degree of solubility provided by the alkoxyalkyl radicals is permanent in the sense that the organopolysiloxanes cannot be cured by heat to the water-insoluble state.

The present invention is based on our discovery of a new class of organopolysiloxanes of a high degree of water solubility and a high degree of stability with regard to aqueous solutions thereof having pH's which vary substantially from 7. Furthermore, the novel organopolysiloxanes of our invention can be converted to the water-insoluble state by the mere application of heat or the use of conventional curing catalysts.

The organopolysiloxanes of the present invention are characterized by the average structural formula $$(1) \quad \left(\left[HO\left(\underset{CHCH_2O}{\overset{R'}{|}}\right)_c\right]_x AOOCC_nH_{2n}\right)_a \frac{[R]_b SiO_{4-a-b}}{2}$$

where A is the nucleus of a saturated aliphatic polyhydroxy compound, which polyhydroxy compound contains at least two hydroxyl groups, R is a member selected from the class consisting of monovalent hydrocarbon radicals and substituted monovalent hydrocarbon radicals, R' is a member selected from the class consisting of hydrogen and methyl, $x$ is an integer equal to one less than the number of hydroxyl groups attached to the polyhydroxy compound, the carbonyl group is attached to a carbon atom other than a silicon-bonded carbon atom, $a$ has a value of from 0.01 to 2.0, inclusive, $b$ has a value of from 0 to 2.49, inclusive, the sum of $a+b$ is from 1.0 to 2.5, inclusive, $c$ is an integer equal to at least 1, e.g., from 1 to 100 or more, and $n$ is an integer equal to from 2 to 18, inclusive, and preferably from 2 to 5. The organopolysiloxane compositions of the present invention can be described generically as polyalkylene oxide esters of carboxyalkyl organopolysiloxanes and polyalkylene oxide ethers of polyhydric alcohol esters of carboxyalkyl organopolysiloxanes in which the organopolysiloxane contains at least one silicon-bonded ester of a carboxy alkyl radical attached to silicon, with any remaining valences of silicon other than the valences which make up the siloxane chain being selected from the class consisting of monovalent hydrocarbon radicals and substituted monovalent hydrocarbon radicals.

As is apparent from an examination of Formula 1, the organopolysiloxanes of the present invention contain both a hydrophobic portion which is the siloxane chain with its attached monovalent hydrocarbon and substituted monovalent hydrocarbon radicals, and a hydrophilic portion which is the ester of the carboxy alkyl radical. The presence of both of these portions in the organopolysiloxane of Formula 1 results in the desirable properties pointed out above.

Among the radicals which are included within the definition of the R group above are, for example, alkyl radicals, e.g., methyl, ethyl, propyl, octyl, octadecyl, etc. radicals; aryl radicals, e.g., phenyl, naphthyl, tolyl, xylyl, etc. radicals; aralkyl radicals, e.g., benzyl, phenylethyl, styryl, etc. radicals; cycloaliphatic radicals, e.g. cyclohexyl, cycloheptyl, cyclohexenyl, etc. radicals; alkenyl radicals, e.g., vinyl, allyl, methallyl, etc. radicals, and numerous substituted monovalent hydrocarbon radicals wherein the substituent is inert with respect to the method by which the compositions of the present invention are employed and which are inert with respect to the carboxyl group of the organopolysiloxane. Among these substituted monovalent hydrocarbon radicals are included halogenated hydrocarbon radicals, nitrated hydrocarbon radicals, sulfone-containing monovalent hydrocarbon radicals, etc., e.g., fluorophenyl, tetrachlorophenyl, chloronaphthyl, dibromophenyl, nitrophenyl, β-nitroethyl, methylsulfonoethyl, etc. radicals.

In Formula 1, A has been defined as the nucleus of a saturated aliphatic polyhydroxy compound, which polyhydroxy compound contains at least two hydroxyl groups. Among the various polyhydroxy compounds of which A is the nucleus, can be mentioned, for example, ethylene glycol, propylene glycol, propanediol-1,3, butanediol-1,4, glycerine, neopentyl glycol, 1,1,1-trimethylol ethane, 1,1,2-trimethylolethane, pentaerythritol, sorbitol, etc.

In defining the elements of Formula 1, $x$ was defined as an integer equal to one less than the number of hydroxyl groups attached to the polyhydroxy compound described above. To expand further on this point, it should be understood that where the polyhydroxy compound is, for example, ethylene glycol, which has two hydroxy groups, $x$ would then be equal to 1, which is one less than the number of hydroxy groups attached to ethylene glycol. As a further illustration, where the polyhydroxy compound is sorbitol, $x$ would be equal to 5, which is one less than the six hydroxy groups present in sorbitol.

From a further consideration of Formula 1, it is seen that the hydroxyl group or groups are attached to the carboxylalkyl group through at least two alkylene oxide radicals, which may be the same or different alkylene oxide radicals. For example, where A is the residue of ethylene glycol and $c$ is equal to 1, $x$ is by definition also equal to 1, and the hydroxyl group is attached to the carboxylalkyl group through two ethylene oxide radicals. On the other hand, where A is the residue of propanediol-1,3 and $c$ and $x$ are the same as above, it is seen that the hydroxyl group is attached to the carboxylalkyl radical through an ethylene oxide radical and a propylene oxide radical.

The scope of the many compositions of Formula 1 will become readily apparent by the following discussion of the methods by which compositions of Formula 1 can be prepared.

The parent organopolysiloxanes from which the products of the present invention are prepared are carboxyalkyl organopolysiloxanes having the formula (2) 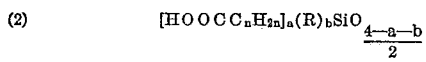

where R, $a$, $b$, and $n$ are as previously defined.

These carboxyalkyl organopolysiloxanes are described and claimed in the copending application of Glen D. Cooper and Maurice Prober, Serial No. 529,896, filed August 22, 1955, and assigned to the same assignee as the present invention. The aforementioned Cooper and Prober application, as well as the other applications referred to in the aforementioned Cooper and Prober application, are hereby incorporated by reference into the present application for the purpose of providing a disclosure of the method of preparing the carboxyalkyl organosiloxanes of Formula 2. Further illustrations of a method for the preparation of certain of the carboxyalkyl organopolysiloxanes of Formula 2 are disclosed in Patent 2,875,177, Bluestein. This Bluestein patent, as well as the applications referred to therein, are also incorporated by reference into the present application for the purpose of teaching the method of preparing the carboxyalkyl organopolysiloxanes of Formula 2.

One method of preparing the carboxyalkyl siloxanes of Formula 2 is by the cohydrolysis of chlorosilanes composed of, for instance, cyanoethyltrichlorosilane, and other cohydrolyzable organochlorosilanes, for instance, dimethyldichlorosilane, trimethylchlorosilane, methyltrichlorosilane, diphenyldichlorosilane, etc., and hydrolyzing the resulting cyanoalkyl polysiloxane to the carboxyalkyl organopolysiloxane. Another method for forming the carboxyalkyl organopolysiloxanes of Formula 2 is by effecting reaction between a water-soluble carboxyalkyl siloxane having the formula (3) 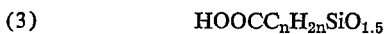

and one or more alkoxysilanes having the formula (4) 

where R is as previously defined and R' is a lower alkyl radical such as a methyl radical, and $d$ is an integer equal to from 1 to 3, inclusive.

One method for forming certain of the organopolysiloxanes of Formula 1 is by the method described in the copending application of one of us, Gustav A. Schmidt, Serial No. 840,250, filed concurrently herewith and assigned to the same assignee as the present invention. This copending application of Gustav A. Schmidt is hereby incorporated by reference into the present application for the purpose of describing the method of preparation of compounds within the scope of Formula 1. The method of this aforementioned Schmidt application involves the reaction of a polyalkylene glycol with a silane containing a silicon-bonded cyanoalkyl radical having the formula (5) 

and at least two silicon-bonded chlorine atoms. By this reaction, the polyalkylene glycol supplies water for the hydrolysis of the nitrile group to a carboxyl group and, at the same time, the polyalkylene glycol reacts with the silicon-bonded chlorine atoms to replace the chlorine atoms with polyalkylene oxide radicals. Thus, for example, triethylene glycol can be reacted with β-cyanoethyltrichlorosilane to form a product having the formula (6) 

The silane of Formula 6 can be hydrolyzed and condensed alone or with one or more silanes of Formula 4 and/or one or more silanes having the following formula (7) 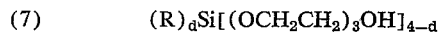

This hydrolysis is carried out in an aqueous acid medium and the hydrolyzed and condensed organopolysiloxane within the scope of Formula 1 is isolated by conventional means.

A second method of preparing the organopolysiloxanes of the present invention within the scope of Formula 1 is by effecting reaction between a carboxyalkyl organopolysiloxane fluid within the scope of Formula 2 and either ethylene oxide or propylene oxide-1,2. During this reaction, the ethylene oxide or propylene oxide reacts with the hydroxy group attached to the carboxyl carbon atom and forms the ester linkage of the composition of Formula 1. At the same time, the ethylene oxide or propylene oxide polymerizes so as to produce from 2 to 20 or more alkylene oxide groups attached to the carboxyl carbon. The reaction between the ethylene oxide or propylene oxide and the carboxyalkyl siloxane of Formula 2 is effected by bringing the two reactants into contact in a pressure vessel which has been heated to a temperature of from 50 to 150° C. to initiate the reaction. In the absence of catalyst, the reaction is relatively slow, so that from two to ten hours may be required to complete the reaction. Accordingly, it is preferred to conduct the reaction in the presence of a suitable catalyst. While many catalysts are available for effecting the reaction, it is preferred to employ a Friedel-Crafts catalyst, and among the most suitable of these Friedel-Crafts catalysts are aluminum chloride, aluminum fluoride, boron trichloride and boron trifluoride. When one of the aforementioned catalysts is employed in the reaction, the reaction proceeds very rapidly and is completed in several minutes. Accordingly, for economic reasons it is much preferred to conduct the reaction in the presence of a catalyst, with boron trifluoride being the preferred catalyst. The amount of catalyst may vary within extremely wide limits, and it has been found that from 0.01 to 5 percent by weight of the catalyst, based on the weight of the ethylene oxide or propylene oxide in the reaction mixture, is sufficient to cause rapid completion of the reaction. While no particular advantage is derived from employing more than 5 percent by weight of the catalyst, based on the weight of the ethylene oxide, no particular disadvantage is derived from the use of such an excess.

The proportions of the ethylene oxide and propylene oxide employed in the reaction with the carboxyalkyl siloxane of Formula 2 vary within extremely wide limits, depending on the desired reaction product and on the particular reactants employed. Since the ethylene oxide or propylene oxide reacts with the carboxyalkyl group of the carboxyalkyl organopolysiloxane, the amount of ethylene or propylene oxide is best described in terms of mols per mol of carboxyalkyl radicals in the carboxyalkyl organopolysiloxane. On this basis, we employ from 2 to 50 or more, and preferably from 2 to 20 mols of the ethylene or propylene oxide per mol of carboxyalkyl radicals in the carboxyalkyl organopolysiloxane. It is obvious that the higher the ratio of the ethylene or propylene oxide to the carboxyalkyl groups, the longer will be the polyalkylene oxide radical attached to the carboxyalkyl group. Thus, where a long polyalkylene oxide chain is desired, such as a chain containing, for example, 15 alkylene oxide units, it is preferred to use a large amount such as from 15 to 50 mols of the alkylene oxide per mol of silicon-bonded carboxyalkyl radicals. Correspondingly, where it is desired to have a short polyalkylene oxide group attached to the molecule, such as a dialkylene oxide radical, we employ a lesser amount of the ethylene oxide or propylene oxide, such as from 2 to 3 mols of the oxide per mol of silicon-bonded carboxyalkyl radicals.

After completion of the reaction between the ethylene oxide or the propylene oxide and the carboxyalkyl siloxane of Formula 2, the reaction mixture is cooled and any unreacted ethylene or propylene oxide is stripped from the reaction mixture, leaving the desired organopolysiloxane of Formula 1 in substantially pure form.

A still further method of preparing the organopolysiloxane of Formula 1 is by converting the carboxyalkyl siloxane of Formula 2 to a polyhydroxy alcohol ester of the carboxyalkyl siloxane, which polyhydroxy ester has the formula (8) 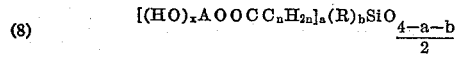

This polyhydroxy alcohol ester is then reacted with ethylene oxide or propylene oxide, which replaces the hydroxyl groups of the polyhydroxy alcohol ester with polyethylene oxide groups or polypropylene oxide groups, thereby forming the organopolysiloxane of Formula 1. The reaction between the polyhydroxy alcohol and the carboxyethyl siloxane of Formula 2 is effected by merely bringing the two reactants into contact in the presence of a conventional esterification catalyst and heating the reaction mixture for a time which varies from a few minutes up to 5 to 10 hours, depending on the particular polyhydroxy alcohol employed and the particular carboxyalkyl organopolysiloxanes employed. Among the many conventional esterification catalysts which can be employed in this reaction can be mentioned, for example, lead oxide, lead acetate, and the like. While the amount of esterification catalyst employed on the reaction is not critical, it has been found that satisfactory results are obtained employing from about 1 to 10 percent by weight of the esterification catalyst based on the weight of the polyhydroxy alcohol. No particular disadvantage is derived from employing more than 10 percent by weight of the esterification catalyst based on the weight of the polyhydric alcohol. The temperature of the esterification radical can vary within wide limits, with satisfactory results being obtained at temperatures as low as room temperature, i.e., 20° C. Temperatures up to 100° C. have also been satisfactory for this esterification reaction and, in general, the reaction proceeds more rapidly at elevated temperatures, so that temperatures of from about 50 to 80° C. are preferred for the reaction. After esterification of the carboxyalkyl siloxane of Formula 2, the water resulting from the esterification is stripped from the reaction mixture and the esterification catalyst is filtered from the liquid reaction product.

A still further and preferred method for the preparation of the polyhydroxy esters of Formula 8 is by the reaction of one or more cyanoalkylchlorosilanes and one or more other organochlorosilanes with one or more of the polyhydroxy alcohols employed in the practice of the present invention. To accomplish this reaction, a blend of the various cyanoalkylchlorosilanes and other organochlorosilanes is added to a polyhydroxy compound and the reaction mixture is heated with stirring to cause reaction between the nitrile radical of the cyanoalkylchlorosilane and the polyhydroxy alcohol to form an ester linkage. This entire reaction mixture is then added to water to cause hydrolysis of the silicon-bonded chlorines and the reaction mixture is heated with stirring to cause condensation of the hydrolyzed product resulting in the esters of Formula 8. In carrying out this reaction, the proportions of the various reactants and the reactant conditions can vary within fairly wide limits.

The cyanoalkylchlorosilanes which can be employed in the preparation of the esters of Formula 8 have the formula (9) 

where R, $a$, $b$, and $n$ are as previously defined. The other organochlorosilanes which can be employed have the formula

(10) 

where R and d are as previously defined. The ratio of the cyanoalkylchlorosilane of Formula 9 to the organochlorosilane of Formula 10 can be varied without limit depending upon the number of ester linkages desired in the resulting ester of Formula 8. Similarly, the types and ratios of the various organochlorosilanes within the scope of Formula 10 may be varied within extremely wide limits depending on the particular character of ester desired. Preferably, the orcanochlorosilanes employed are methylchlorosilanes within the scope of Formula 10.

During the reaction of the silanes of Formula 9 and Formula 10 with the polyhydroxy compound, the polyhydroxy compound reacts with both the nitrile radical of the silane of Formula 9 and the silicon-bonded chlorine atoms of the silanes of both Formula 9 and Formula 10. Thus, on a molar basis, at least one mol of the polyhydroxy compound is provided for each mol of cyanoalkyl radical in the silane of Formula 9 and for each mol of silicon bonded chlorine in the silanes of Formulae 9 and 10. This reaction involving the polyhydroxy compound is effected in a time which varies from a few minutes to several hours depending on the reaction temperature and the amount of stirring. Preferably, the reaction is carried out at a temperature of 50 to 100° C. to a time of about 1 to 2 hours.

The hydrolysis of the reaction product of the silanes of Formulae 9 and 10 and the polyhydroxy compound is carried out by adding this reaction product to a large volumetric excess such as a 10 to 100-fold volumetric excess of water and stirring the reaction mixture at a temperature of about 50 to 100° C. for from ½ to 3 or more hours. At this time, the reaction mixture is neutralized by the addition of a suitable basic material such as sodium bicarbonate or an alkali metal hydroxide. The presence of the salt resulting from the neutralization causes the formation of an aqueous layer and a silicone layer which is separated by decantation. The ester of Formula 8 is then obtained by stripping the reaction mixture to remove volatile materials.

The reaction between the ethylene oxide or propylene oxide and the ester of Formula 8 is accomplished by the same method and under the same conditions as the reaction between the ethylene or propylene oxide and the carboxyalkyl organopolysiloxane of Formula 2. The reaction product is isolated by the same method. The principal difference in the instant reaction is in the basis of calculation of the amount of ethylene or propylene oxide in the reaction mixture. Since the ethylene oxide or propylene oxide reacts with the hydroxyl group of the polyhydric alcohol ester, the amount of ethylene or propylene oxide employed is based on the number of mols of hydroxyl groups in this ester. It has been found that satisfactory results are obtained employing from 2 to 20 or more, such as 2 to 100 mols, of ethylene oxide per mol of hydroxyl groups in the ester. The low ratio of ethylene or propylene oxide to hydroxyl groups is employed when it is desired to provide short polyalkylene oxide chains attached to the polyhydric alcohol nucleus. Larger amount of the polyethylene or propylene oxide are employed when longer alkylene oxide chains are desired on the polyhydric alcohol residue.

In order that those skilled in the art may better understand how the present invention may be practiced, the following examples are given by way of illustration and not by way of limitation. All parts are by weight.

*Example 1*

A reaction vessel was charged with 750 parts of triethylene glycol and 190 parts of cyanoethyltrichlorosilane. This mixture was stirred at 75° C. for 30 minutes and then heated for three hours at 125° C. At the end of this time, the reaction mixture was fractionally distilled to produce about 600 parts of a silane having the formula:

(11)    $[HO(CH_2CH_2O)_3]_3SiCH_2CH_2CO[OCH_2CH_2]_3OH$

The identity of this material was confirmed by infrared analysis. One part of the silane of Formula 11 was added to 10 parts of a 10% aqueous hydrochloric acid solution and the reaction mixture was heated at 50° C. for 10 minutes to hydrolyze and condense the silane of Formula 11. At the end of this time, the reaction mixture was stripped to remove the hydrochloric acid solution and the triethylene glycol, resulting in a siloxane having the formula:

(12)    $HO[CH_2CH_2O]_3OCCH_2CH_2SiO_{1.5}$

This product was a liquid. In order to evaluate the surface active properties of the siloxane of Formula 12, one part of this siloxane was added to a mixture of 10 parts of a trimethylsilyl chain-stopped linear polydimethylsiloxane having a viscosity of 25 centipoises at 25° C. and 100 parts of water. When this mixture was agitated, an emulsion was formed which exhibited outstanding stability. When the polydimethylsiloxane and water mixture were agitated without the siloxane of Formula 12, it was impossible to form a stable emulsion.

*Example 2*

A monoglyceride of a beta-carboxyethyl organopolysiloxane having the formula:

(13)    $[HOCH_2CH(OH)CH_2OOCCH_2CH_2]_{0.20}[CH_3]_{1.82}SiO_{0.99}$ was prepared by adding a blend of 132 parts of beta-cyanoethyltrichlorosilane, 274 parts of dimethyldichlorosilane, and 79 parts of trimethylchlorosilane to 278 parts of glycerin over a period of 2 hours. This reaction mixture was heated for 4 hours at a temperature of 85 to 95° C. After cooling the reaction mixture to room temperature the mixture was added with stirring to approximately 2,000 parts of water and the mixture was stirred for approximately 2 hours resulting in an upper aqueous layer and lower viscous oil layer. Seven hundred fifty parts of benzene were added to dissolve the oil and the aqueous layer was separated from the mixture. The benzene layer was washed with 250 parts of a saturated sodium chloride solution, then with 250 parts of a saturated sodium bicarbonate solution and finally with 250 parts of a saturated sodium chloride solution. The benzene layer from the washing was separated by decantation and stripped to a pot temperature of 204° C. at 13 millimeters resulting in a viscous fluid product which was pale yellow and which had an infrared curve corresponding to Formula 13 above. This material had a specific gravity of 1.145, an index fraction $N_D^{25}$ 1.1442 and a viscosity at 38°

C. of 472 centipoises. Sixty parts of this monoglyceride fluid, 141 parts of ethylene oxide, and 2 parts of a boron trifluoride ether complex prepared by dissolving about 20 parts of boron trifluoride in 100 parts of ethyl ether were added to a pressure vessel. The contents of the pressure vessel were heated for one hour at 150° C. under autogenous pressure and the reaction mixture was then cooled and stripped to a pot temperature of 105° C. at 30 mm. This resulted in 132 parts of an organopolysiloxane which had a refractive index $N_D^{25}$ 1.4530 and a viscosity of 210 centistokes at 25° C. The identity of this material was confined by infrared analysis, which established that its formula was (14)

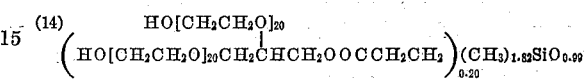

*Example 3*

Following the procedure of Example 2, an organopolysiloxane fluid was prepared which contained β-carboxyethylsiloxane monoglyceride units, dimethylsiloxane units and trimethylsiloxane units, with each silicon atom having an average of 0.10 silicon bonded β-carboxyethyl monoglyceride radical and 1.92 silicon-bonded methyl radicals. Seventy parts of this monoglyceride and 140 parts of ethylene oxide, together with 2 parts of the boron trifluoride ether complex were added to a pressure vessel and heated for one hour at 150° C. At the end of this time, the resulting fluid was stripped to a pot temperature of 110° C. at 30 mm. to produce 131 parts of an organopolysiloxane fluid having the formula (15)

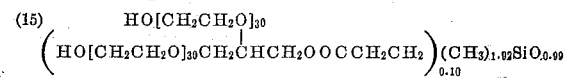

The identity of the above material was confirmed by infrared analysis. This fluid had a refractive index $N_D^{25}$ 1.4570 and a viscosity of 316 centistokes at 25° C.

*Example 4*

The hydroxyethyl ester of an organopolysiloxane consisting of beta-carboxyethylsiloxane units, dimethylsiloxane units, and trimethylsiloxane units was prepared by adding a blend of 188.5 parts of beta-cyanoethyltrichlorosilane, 374 parts of dimethyldichlorosilane, and 119.5 parts of trimethylchlorosilane to 885 parts of ethylene glycol over a period of one and one-half hours. This mixture was heated for two and one-half hours at a temperature of about 85° C. and was thereafter hydrolyzed with about 3,000 parts of water. The hydrolysis mixture was stirred vigorously for about 3 hours at which time an oil layer precipitated and was neutralized with solid sodium bicarbonate. The solids resulting from the neutralization were filtered from the fluid and the filtrate was stripped to a temperature of 205° C. at one millimeter resulting in a fluid having an average of 1.82 silicon-bonded methyl groups per silicon atom and 0.20 ester group per silicon atom. The identity of this material was confirmed by infrared analysis. Seventy parts of this hydroxyethyl ester were added to 215 parts of ethylene oxide and 2 parts of the boron trifluoride ether complex of Example 2 in a pressure vessel and the vessel was heated for one hour at 150° C. At the end of this time, the reaction mixture was stripped at 120° C. and 30 mm. to yield 150 parts of a product having the formula:

(16)    $(HO[CH_2CH_2O]_{40}OCCH_2CH_2)_{0.20}(CH_3)_{1.82}SiO_{0.89}$

The identity of this material was confirmed by infrared analysis. This material had a refractive index $N_D^{25}$ 1.4555 and a viscosity of 500 centistokes at 25° C.

*Example 5*

Following the procedure of Example 4, the hydroxyethyl ester of a carboxyethyl silicone fluid was prepared from beta-cyanoethyltrichlorosilane, dimethyldichlorosilane, and trimethylchlorosilane. This material contained an average of 0.10 silicon-bonded ester radicals per silicon atom and 1.92 silicon-bonded methyl radicals per silicon atom. Sixty parts of this hydroxyethyl ester, 150 parts of ethylene oxide, and 2 parts of the boron trifluoride ether complex were added to a pressure vessel and heated for one hour at 150° C. At the end of this time, the resulting fluid was stripped to a pot temperature of 115° C. at 30 mm. On standing, this fluid separated into two layers, the top layer of which had a viscosity of 55 centistokes at 25° C., the lower layer of which had a viscosity of 100 centistokes at 25° C. The identity of each of these materials was confirmed by infrared analysis. Formulae 17 and 18 below show the identity of the upper layer and the lower layer respectively.

(17) $(HO[CH_2CH_2O]_5OCCH_2CH_2)_{0.10}(CH_3)_{1.92}SiO_{0.99}$
(18) $(HO[CH_2CH_2O]_{50}OCCH_2CH_2)_{0.10}(CH_3)_{1.92}SiO_{0.99}$

*Example 6*

Following the procedure of Example 4, the hydroxyethyl ester of a siloxane fluid containing beta-carboxyethylsiloxane units and trimethylsiloxane units was prepared from a beta-carboxyethyltrichlorosilane and trimethylchlorosilane. This material had the average formula:

(19) $(HOCH_2CH_2OOCCH_2CH_2)_{0.45}(CH_3)_{1.60}SiO_{0.975}$

Thirty parts of this hydroxyethyl ester were added to 150 parts by weight of ethylene oxide and 2 parts by weight of the boron trifluoride ether complex in a pressure vessel which was sealed and heated for one hour at 150° C. At the end of this time, the resulting material was cooled, stripped at 110° C. and 30 mm. to produce 94 parts of a fluid having the formula:

(20) $(HO[CH_2CH_2O]_{15}OCCH_2CH_2)_{0.45}(CH_3)_{1.60}SiO_{0.975}$

The identity of this material was confirmed by infrared analysis. It had a refractive index $N_D^{25}$ 1.4583 and a viscosity of 190 centistokes at 25° C.

*Example 7*

An organopolysiloxane within the scope of the present invention is prepared by mixing 50 parts of the hydroxyethyl ester of the caboxyethyl(methyl)siloxane described in Example 6 with one part of the boron trifluoride ether complex described above, and 50 parts of propylene oxide. This mixture is heated under autogenous pressure for 30 minutes at 110° C. and the resulting product is stripped to a pot temperature of 100° C. at 20 mm. to produce an organopolysiloxane having the formula:

(21)
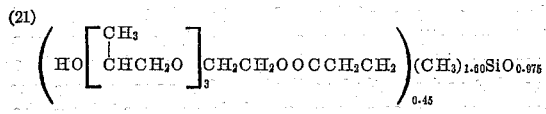

*Example 8*

Gamma-cyanopropyl methyldichlorosilane is prepared by refluxing a mixture of equal molar amounts of allyl cyanide and methyldichlorosilane in the presence of 5% by weight of platinum. After refluxing this mixture for 4 hours, the resulting product is fractionally distilled to produce the methyl-gamma-cyanopropyldichlorosilane, which is cohydrolyzed with diphenyldichlorosilane and trimethylchlorosilane by adding a mixture of these three chlorosilanes to a large excess of water and agitating the mixture for several hours, during which time an organopolysiloxane layer and an aqueous layer are formed. The organopolysiloxane layer is separated from the aqueous layer and added to an excess of 5% sodium hydroxide solution, which causes hydrolysis of the nitrile radical and the formation of the sodium salt of the gamma-carboxypropyl radical. This solution is neutralized with hydrochloric acid, resulting in an aqueous layer and an organopolysiloxane layer. The organopolysiloxane, which is isolated from this reaction mixture, has the formula:

(22) $(HOOCCH_2CH_2CH_2)_{0.25}(C_6H_5)_{0.50}(CH_3)_{1.75}SiO_{0.75}$

One hundred parts of the carboxyalkylsiloxane of Formula 20 are added to a pressure vessel containing 50 parts of propylene oxide and 5 parts by weight of aluminum chloride. The pressure vessel is sealed and heated at a temperature of 100° C. with constant agitation for 1½ hours. At the end of this time, the reaction mixture is cooled to room temperature and then stripped at a pot temperature of 120° C. at 20 mm. to produce an organopolysiloxane having the formula:

(23) $(HO[CH(CH_3)CH_2O]_5OCCH_2CH_2CH_2)_{0.25}$
$(C_6H_5)_{0.50}(CH_3)_{1.75}SiO_{0.75}$

*Example 9*

A beta-carboxyethylsiloxane is converted to a product of the present invention by adding 50 parts of the carboxyethylsiloxane to 300 parts of ethylene oxide and 5 parts of sodium hydroxide. This mixture is heated in a pressure vessel to a temperature of 100° C. for 2 hours under autogenous pressure. At the end of this time, the reaction mixture is stripped to a pot temperature of 90° C. at 5 mm. to produce a product having the formula:

(24) $HO[CH_2CH_2O]_{100}OCCH_2CH_2SiO_{1.5}$

Examples 10, 11 and 12, which follow, illustrate the use of the organopolysiloxane of the present invention as emulsifying agents.

*Example 10*

An emulsion was prepared by mixing 5 parts of the organopolysiloxane product of Example 2, 10 parts of the organopolysiloxane product of Example 6, 100 parts by weight of a methyl hydrogen polysiloxane fluid which comprised a trimethylsilyl chain-stopped methyl hydrogen polysiloxane having a viscosity of about 25 centistokes at 25° C., and 250 parts of water. This mixture was inverted by a pass through a colloid mill to form a stable emulsion. A 0.75% silicone pad bath was prepared by adding 10 parts by weight of the foregoing emulsion to 368 parts of water and 4 parts of a 6% emulsion of tin oleate in a dimethylpolysiloxane fluid. Cotton, rayon and rayon acetate fabrics were padded with this bath and were then cured at 150° for 6 minutes. At the end of this time, the initial spray rating of each of these fabrics was measured and found to be equal to 100. The initial spray rating was determined in accordance with the test described in the 1945 Yearbook of the American Association of Textile Chemists and Colorists, vol. XX, pages 229–233.

*Example 11*

A silicone emulsion was prepared by mixing 2 parts of the organopolysiloxane product of Example 2, 6 parts of the organopolysiloxane product of Example 6, 125 parts of the methyl hydrogen polysiloxane fluid described in Example 9, and 280 parts of water. This mixture was inverted by a pass through a colloid mill to form a stable emulsion. A pad bath containing 0.75% silicone fluid was prepared from the above emulsion by adding 10 parts of the emulsion to 388 parts of water and 2 parts of the 6% tin oleate emulsion described in Example 9. The emulsion was padded onto cotton, rayon, and rayon acetate fabrics and then cured at 150° C. for 6 minutes. Again, the initial spray rating of each of these materials was equal to 100.

*Example 12*

In order to further evaluate the surface active properties of the organopolysiloxanes of the present invention and to compare these materials with conventional emulsifying agents, a number of aqueous solutions were prepared and agitated for 30 seconds to produce a foam.

The time required for the foam to reduce in height to less than 1 cm. was measured. The organopolysiloxane employed in the examples and referred to in the table below is the product of Example 6 above. The two conventional emulsifying agents employed are Dreft, a commercial ionic emulsifying agent, and Pluronic F-68, a commercial non-ionic emulsifying agent. In the table below are listed the concentrations of the various emulsifying agents in the aqueous solution and the time required for the height of the foam to become less than 1 cm.

| Aqueous solution: | Time, minutes |
|---|---|
| 0.05% Dreft | 20 |
| 0.05% Dreft / 0.5% silicone | 45 |
| 0.5% silicone | 40 |
| 0.05% Dreft / 0.5% Pluronic F-68 | 15 |

While the foregoing examples have of necessity been limited to only a few of the very many variables within the scope of the present invention, it should be understood that the present invention covers a broad class of organopolysiloxane compositions which comprises broadly polyethylene oxide and polypropylene oxide esters of various carboxyalkyl organopolysiloxanes, and polyethylene oxide and polypropylene oxide ethers of various polyhydric alcohol esters of carboxyalkyl organopolysiloxanes. All of these various materials are prepared by methods specifically illustrated in the examples above and described further in the foregoing description of the present invention.

The examples have also of necessity been directed to only a few of the many process variables which are practicable in preparing the process of the present invention. It should be understood, however, that the process of the present invention is illustrated by both the specific examples given above as well as by the detailed description of the present invention which preceded these examples.

In addition to employing the organopolysiloxanes of the present invention as emulsifying agents in emulsifying various water-insoluble organopolysiloxanes and water, it should be understood that the compositions of the present invention are broadly applicable to the emulsification of any system in which emulsifying agents containing both a hydrophobic portion and a hydrophilic portion are conventionally employed.

What we claim as new and desire to secure by Letters Patent of the United States is:

1. An organopolysiloxane having the formula (1) 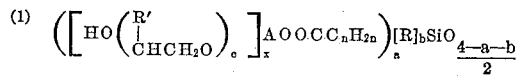

where A is the nucleus of a saturated aliphatic polyhydric alcohol, R is a member selected from the class consisting of monovalent hydrocarbon radicals, halogenated monovalent hydrocarbon radicals, nitrated monovalent hydrocarbon radicals and sulfone-containing monovalent hydrocarbon radicals, R′ is selected from the class consisting of hydrogen and methyl, $x$ is an integer equal to one less than the number of hydroxyl groups in the polyhydric alcohol from which A is derived, the carbonyl carbon atom is attached to a carbon atom other than a silicon-bonded carbon atom, $a$ has a value of from 0.01 to 2.0, $b$ has a value of from 0 to 2.49, the sum of $a+b$ is equal to from 1 to 2.5, $c$ is an integer equal to at least 1, and $n$ is an integer equal to from 2 to 18.

2. A hydroxyl-containing polyethylene oxide ether of a monoglyceride ester of a methyl-$\beta$-carboxyethyl siloxane.

3. A polyethylene oxide ester of a methyl-$\beta$-carboxysiloxane containing a hydroxyl group attached to the carboxyethyl radical through the polyethylene oxide group.

4. A polypropylene oxide ether of the ethylene glycol ester of a methyl-$\beta$-carboxyethyl siloxane, said ether containing a hydroxyl group attached to the ethylene glycol residue through the polypropylene oxide group.

5. A polypropylene oxide ester of a methylphenyl-gamma-carboxypropyl siloxane having an average of from 1.0 to 2.5 total methyl, phenyl and gamma-carboxypropyl radicals per silicon atom, said ester containing a hydroxyl group attached to the carboxypropyl group through the polypropylene oxide group.

6. An organopolysiloxane in which the organo groups are the polyethylene glycol ester of $\beta$-carboxyethyl radicals, said organopolysiloxane containing a hydroxyl group attached to the carboxyethyl radical through the polyethylene glycol residue.

7. The process for forming an ester selected from the class consisting of the hydroxyl-containing polyethylene oxide ester and the hydroxyl-containing polypropylene oxide ester of a carboxyalkyl organopolysiloxane having the formula $$[HOOCC_nH_{2n}]_a(R)_bSiO_{\frac{4-a-b}{2}}$$

which comprises heating said carboxyalkyl organopolysiloxane with a member selected from the class consisting of ethylene oxide and propylene oxide, where R is a member selected from the class consisting of monovalent hydrocarbon radicals, halogenated monovalent hydrocarbon radicals, nitrated monovalent hydrocarbon radicals and sulfone-containing monovalent hydrocarbon radicals, the carbonyl carbon is attached to a carbon atom other than a silicon-bonded carbon atom, $a$ has a value of from 0.01 to 2.0, $b$ has a value of from 0 to 2.49, and the sum of $a+b$ is equal to from 1 to 2.5, and $n$ is an integer equal to from 2 to 18.

8. The process which comprises heating (1) a $\beta$-carboxyethyl organopolysiloxane having an average of from 0.01 to 2.0 $\beta$-carboxyethyl radicals per silicon atom and from 0 to 2.49 organo groups per silicon atom, with an average of from 1 to 2.5 total $\beta$-carboxyalkyl radicals and organo groups per silicon atom, the organo groups being selected from the class consisting of monovalent hydrocarbon radicals, halogenated monovalent hydrocarbon radicals, nitrated monovalent hydrocarbon radicals and sulfone-containing monovalent hydrocarbon radicals with (2) a member selected from the class consisting of ethylene oxide and propylene oxide.

9. The process which comprises heating (1) the ethylene glycol ester of a $\beta$-carboxyethyl organopolysiloxane having an average of from 0.01 to 2.0 $\beta$-carboxyethyl radicals per silicon atom and from 0 to 2.49 organo groups per silicon atom, with an average of from 1 to 2.5 total $\beta$-carboxyethyl radicals and organo groups per silicon atom, the organo groups being selected from the class consisting of monovalent hydrocarbon radicals, halogenated monovalent hydrocarbon radicals, nitrated monovalent hydrocarbon radicals and sulfone-containing monovalent hydrocarbon radicals with (2) a member selected from the class consisting of ethylene oxide and propylene oxide.

10. The process of claim 9 in which the alkylene oxide is ethylene oxide.

11. The process which comprises heating a polyhydric alcohol ester of a carboxyalkylpolysiloxane having the formula:

$$[(HO)_xAOOCC_nH_{2n}]_a(R)_bSiO_{\frac{4-a-b}{2}}$$

with a member selected from the class consisting of ethylene oxide and propylene oxide, where A is the nucleus of a saturated aliphatic polyhydric alcohol, R is a member selected from the class consisting of monovalent hydrocarbon radicals, halogenated monovalent hydrocarbon radicals, nitrated monovalent hydrocarbon radicals and sulfone-containing monovalent hydrocarbon radicals, $x$ is an integer equal to 1 less than the number of hydroxyl groups in the polyhydric alcohol from which A is derived, the carbonyl carbon atom being attached to a carbon atom other than a silicon-bonded carbon atom, $a$ has a value of from 0.01 to 2.0, $b$ has a value of from 0 to 2.49, the sum of $a$ plus $b$ is equal to from 1 to 2.5 and $n$ is an integer equal to from 2 to 18.

References Cited in the file of this patent

UNITED STATES PATENTS

| | | |
|---|---|---|
| 2,723,987 | Speier | Nov. 15, 1955 |
| 2,763,675 | Prochaska | Sept. 18, 1956 |
| 2,916,507 | Kerschner et al. | Dec. 8, 1959 |

FOREIGN PATENTS

| | | |
|---|---|---|
| 788,842 | Great Britain | Jan. 8, 1958 |